Feb. 5, 1924.  
G. J. ULLRICH  
SIFTER  
Filed Dec. 26, 1922

1,482,873

INVENTOR  
George J. Ullrich, Dec'd.  
Alice Ullrich, Executrix  
By Nissen & Crane ATTYS.

Patented Feb. 5, 1924.

1,482,873

UNITED STATES PATENT OFFICE.

GEORGE J. ULLRICH, DECEASED; BY ALICE ULLRICH, EXECUTRIX, OF CHICAGO, ILLINOIS, ASSIGNOR, BY MESNE ASSIGNMENTS, TO ULLRICH TINWARE COMPANY, OF CHICAGO, ILLINOIS, A CORPORATION OF ILLINOIS.

SIFTER.

Application filed December 26, 1922. Serial No. 608,904.

*To all whom it may concern:*

Be it known that GEORGE J. ULLRICH, late a citizen of the United States, but now deceased, has invented certain new and useful Improvements in Sifters, of which the following is a specification.

This invention relates to sifters for flour or similar material and has for its object the provision of a device of the class named which shall be of improved construction and convenient and efficient in operation.

The invention is exemplified in the combination and arrangement of parts shown in the accompanying drawing and described in the following specification, and it is more particularly pointed out in the appended claims.

In the drawing—

Figure 1:
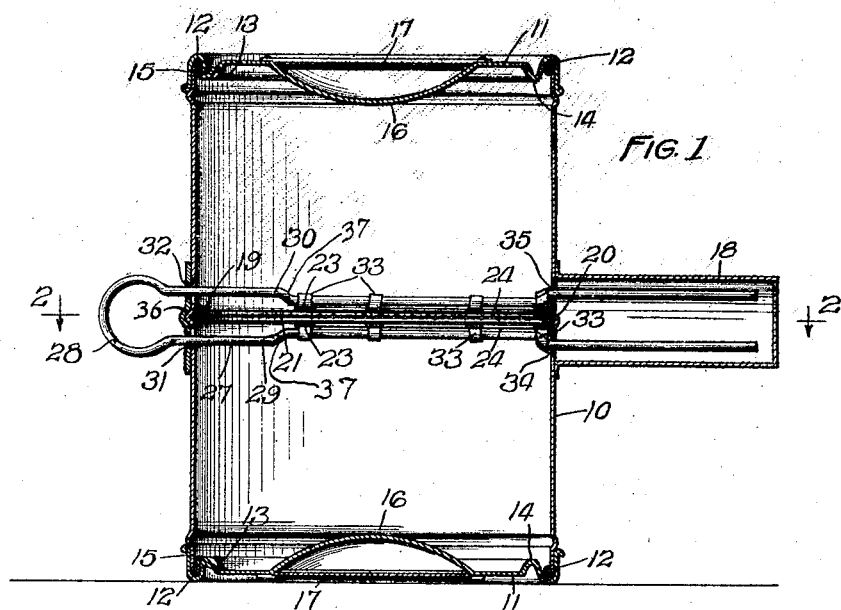
Fig. 1 is a vertical section of a flour sifter showing one embodiment of the present invention.

As shown in the drawing, the sifter comprises a hollow barrel or cylinder 10 having removable heads or covers 11, one at each end of the cylinder. The ends of the cylinder walls are provided with beads 12 which project inwardly and which enter grooves or channels 13 formed on the inner face of the cover members 11 adjacent their peripheries. At the inner edge of the groove 13 there is an inwardly projecting rib 14 and at spaced points the metal forming this rib is pressed outwardly to form projections 15 which snap past the beads 12 when the covers are moved into place, thus retaining them securely in position to close the ends of the sifter barrel.

The central portions of the heads 11 are bulged inwardly, as shown at 16, and a handle bar 17 is secured to the outer face of each of the heads and bridges the depression formed by the inwardly bent portion 16. In this way a handle is provided which can be readily grasped to remove the cover or replace it upon the sifter and yet the sifter will set flat upon a supporting surface without interference by a projecting handle.

Figure 2:
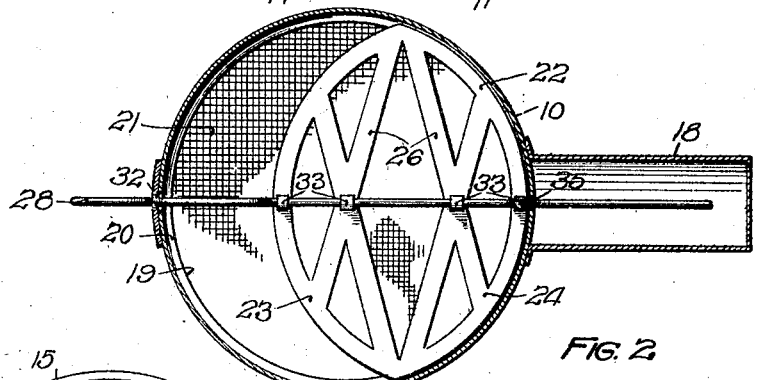
Fig. 2 is a section on line 2—2 of Fig. 1.
Figure 3:
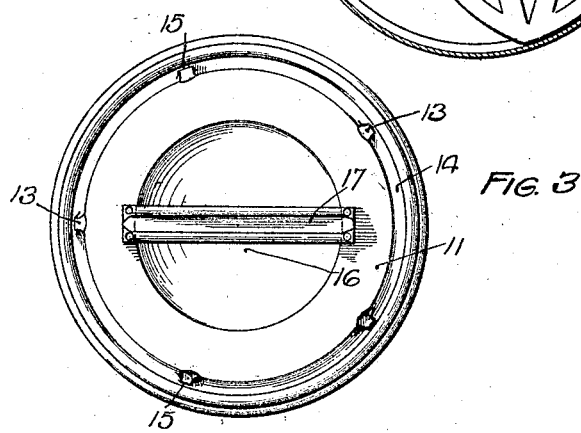
Fig. 3 is a top plan view of one of the heads of the sifter barrel.

Midway between the ends of the sifter and secured to the outer periphery thereof is a stem or handle 18 preferably formed of sheet metal having the interior thereof hollow. Midway between the ends of the sifter the wall 10 is crimped outwardly to form an internal peripheral groove 19 for receiving a circular frame 20 which holds a sifter screen 21 forming a web across the interior of the barrel 10. The frame 20, as shown in Figs. 1 and 2, may be made of a circular strip of sheet metal having the edges bent into U-formation to grasp the periphery of the screen 21. The frame is made of the proper diameter to fit closely in the groove 19 and is sprung into place where it will remain under ordinary conditions without further fastening.

At each side of the screen 21 is a flat sheet metal agitator 22 having peripheral bars 23 and 24 shaped to conform to the curvature of the drum 10, the agitator, however, being of less width than the drum to permit a reciprocating movement parallel with the plane of the screen 21 and adjacent the opposite surfaces thereof. Transverse bars 26 form braces for the peripheral bars 23 and 24 and serve as additional agitating members.

A wire or rod 27 is bent upon itself to form a handle 28, the bifurcations 29 and 30 of the wire extending through openings 31 and 32, respectively, in the wall of the drum 10. The prongs 29 and 30 are positioned adjacent the outer faces of the agitators 22 and are secured thereto by solder or other securing means 33. The inner ends of the prongs 29 and 30 project through openings 34 and 35, respectively, into the hollow interior of the handle 18. It will be seen that the agitators 22 may be moved across the opposite faces of the screen wire 21 by reciprocating the ring 28 back and forth relative to the barrel of the sifter.

In operation, one of the covers or heads 11 is removed and a quantity of flour or other material to be sifted is placed in the upper end of the drum 10. The head is then sprung into place where it is securely held by the projections 15 and the ring 28 is reciprocated back and forth until the flour has passed through the screen 21. The sifter may then be inverted and the operation repeated as many times as is desirable to impart the proper temper to the flour and thoroughly mix the baking powder or other ingredients used therewith. It is a well-known fact that repeated sifting of the flour puts it in a condition which contributes to the quality of the product after baking, and with the present invention this may be accomplished without the use of bowls or other containers and with a minimum of effort and danger of spilling the material.

The cylindrical handle 18 projecting radially from the barrel 10 enables the operator to grasp the handle in such a manner that the device may be turned half a revolution without shifting the grip of the hand upon the handle. At the same time the sifter is held in position to permit easy operation of the agitator by the ring 28. The beads 12 and the projections 15 provide an automatic lock for holding the covers in place but one which will permit removal thereof when sufficient force is exerted. The absence of catches which require special operation to secure the covers in place, insures automatic locking of the covers when placed in position and prevents accidental removal due to lack of proper attention to the locking apparatus. The bar handle 17 bridging the depressions in the centers of the covers permit the device to set upon a table or other support either side up and without danger of tipping or upsetting.

The construction is extremely simple to manufacture, all of the sheet metal parts being formed by stamping operations with a minimum amount of soldering to secure the parts together and the resulting construction is one which is most efficient and convenient in operation.

I claim:—

1. A sifter comprising a hollow cylinder having a sifter screen extending transversely of said cylinder and dividing the interior thereof into two compartments, covers for the ends of said cylinders having depressions in the outer faces thereof, and handles for said covers extending across said depressions and substantially in the planes of the ends of said cylinder.

2. A sifter comprising a sheet metal cylinder, a sifter screen arranged transversely of said cylinder between the ends thereof and dividing the interior of said cylinder into compartments, agitators positioned at opposite sides of said screen and having arcuate edges and transverse bars, actuating rods secured to said agitators and extending through openings in the walls of said cylinder, and a hollow handle member extending radially from said cylinder and positioned to receive the projecting ends of said actuating rods.

3. A sifter comprising a hollow sheet metal cylinder or tube having an internal peripheral groove midway between the ends thereof and having inwardly projecting beads adjacent said ends, closures for said ends having projections for engaging said beads to retain said closures in place, a screening member arranged transversely of said tube and held in place in said interior peripheral groove, agitators at opposite sides of said screening member, rods extending through opposite walls of said tube and connected with said agitators, a handle member at one side of said tube for reciprocating said rods, and a supporting handle at the opposite side of said tube extending radially therefrom and having an opening therein for receiving the projecting ends of said rods.

4. A sifter comprising a cylindrical housing having a reticulated diaphragm extending transversely thereof, a hollow handle projecting radially from the exterior of said housing, an agitator positioned adjacent the surface of said diaphragm, and an actuating rod connected with said agitator and having one end thereof extending into the interior of said handle and having the other end thereof projecting from said housing at a point opposite said handle and providing means for grasping said rod to operate said agitator.

5. A sifter comprising a hollow sheet metal cylindrical housing, a reticulated diaphragm arranged transversely of said housing intermediate the ends thereof, agitator frames positioned adjacent the opposite faces of said diaphragm, a handle for said sifter projecting radially from the exterior thereof, an actuator for said diaphragm comprising a rod bent upon itself to provide bifurcations one of which is positioned adjacent each of said agitator frames, the portions of said rod adjacent said frames being offset inwardly, the walls of said housing having openings for receiving the opposite ends of said actuator rod, the free ends of said rod extending into said handle while the bent end forms a loop diametrically opposite said handle by which said rod may be grasped to operate said agitators, the openings adjacent said loop being of sufficient size to admit the offset portions of said rod, and a cover plate for closing the excess portions of said last-mentioned openings.

In testimony whereof I have signed my name to this specification on this 7th day of December, A. D. 1922.

ALICE ULLRICH,
*Executrix of George J. Ullrich, deceased.*